United States Patent [19]

Tomar

[11] 4,144,297
[45] Mar. 13, 1979

[54] METHOD OF INJECTION MOLDING A FOAMED THERMOPLASTIC RESIN BALL CORE HAVING AN INTEGRAL SKIN

[75] Inventor: Julius Tomar, Port-au-Prince, Haiti

[73] Assignee: Home of Champions, S. A., Port-au-Prince, Haiti

[21] Appl. No.: 858,415

[22] Filed: Dec. 7, 1977

[30] Foreign Application Priority Data

Dec. 28, 1976 [HT] Haiti .................. 139-Reg. 4

[51] Int. Cl.² .................................. B29D 27/00
[52] U.S. Cl. ........................... 264/45.5; 264/51; 264/237; 264/328; 264/DIG. 5; 264/DIG. 14; 264/DIG. 83; 273/60 R; 273/60 B; 521/95; 521/149
[58] Field of Search ............ 264/45.5, 51, 53, 54, 264/46.9, DIG. 83, DIG. 14, DIG. 5, 328, 237; 260/42.29; 273/60 R, 60 B; 521/95, 149

[56] References Cited

U.S. PATENT DOCUMENTS

| | | | |
|---|---|---|---|
| 1,345,904 | 7/1920 | Wishart | 264/51 X |
| 1,538,789 | 5/1925 | Flemming | 264/54 X |
| 1,803,121 | 4/1931 | Meurisse | 264/51 X |
| 2,753,599 | 7/1956 | Pietraszek et al. | 264/46.9 |
| 3,069,170 | 12/1962 | Dillon | 264/DIG. 83 |
| 3,268,636 | 8/1966 | Angell | 264/51 |
| 3,313,545 | 4/1967 | Bartsch | 260/42.29 X |
| 3,468,990 | 9/1969 | Odell | 264/45.5 |
| 3,776,989 | 12/1973 | Annis et al. | 264/53 |
| 3,905,150 | 9/1975 | Dawn | 264/237 X |
| 3,976,295 | 8/1976 | Heald | 264/45.5 X |

*Primary Examiner*—Philip Anderson

[57] ABSTRACT

A method of forming a ball core is disclosed. A flowable homogeneous mass of a thermoplastic resin and a blowing agent is injected into the spherical cavity of a mold under temperature and pressure conditions sufficient to activate the blowing agent. The mold is cooled to 32° to 65° F. so as to form a skin on the surface of the mass. The mass is held within the mold cavity for a sufficient time so that the skin has adequate strength to prevent its rupture by blowing agent contained within the mass, upon removal of the mass from the mold cavity. The mass is cooled at an exterior temperature of 32° to 65° F. A ball core for baseballs and softballs is also disclosed.

9 Claims, 1 Drawing Figure

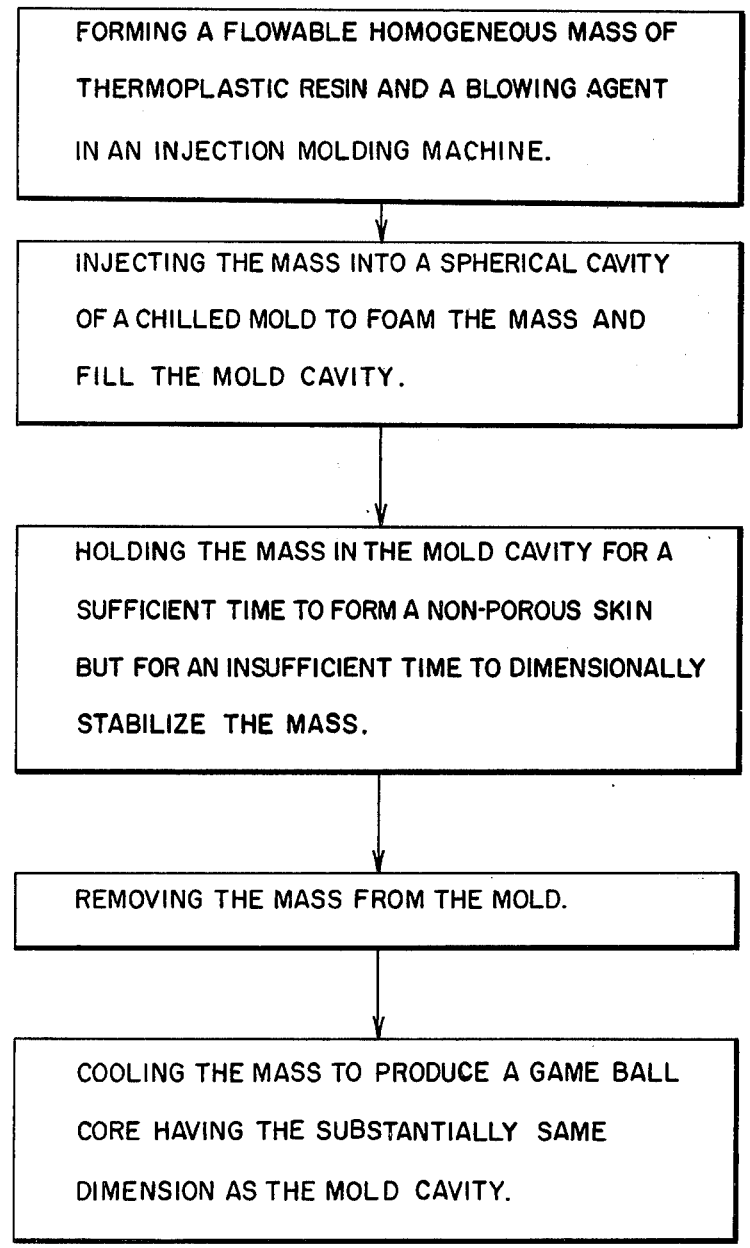

METHOD OF INJECTION MOLDING A FOAMED THERMOPLASTIC RESIN BALL CORE HAVING AN INTEGRAL SKIN

BACKGROUND OF THE INVENTION

1. Field of the Invention

This invention relates to a method of forming ball cores and more particularly to a method of forming ball cores of thermoplastic material.

2. Description of the Prior Art

Baseballs, as are used in the United States by professional leagues and little leagues, are formed of a cork or rubber core wound with wool yarn and cotton thread, and covered with a stitched, two-piece leather cover. In some instances the cover may be vinyl or rubber, especially in the little leagues where the durability of practice balls is essential. Consequently, the density of the baseball along with its attendant properties is determined by its materials of construction and by how tightly the wool yarn is wound. Therefore, there are variables in baseball manufacturing which are not capable of adequate control and baseball manufacturers have endeavored to find materials of construction sufficient to provide consistency to their product.

Softballs such as are used in both slow and fast pitch softball leagues are manufactured in various dimensions with a vast range of physical properties. One common design uses a cork or kapok core wound with synthetic yarn or thread with a cover formed upon the surface of the softball much the same as a baseball. Participants in softball leagues have desired to have a softball of constant properties to provide consistency to their game.

Also, a major factor in the production of both baseballs and softballs is cost since the winding of cores involves substantial labor costs or investment in winding machines.

Confronted with the problem of a uniform product along with increasing labor and capital costs, ball manufacturers endeavored to form ball cores of plastic material to solve both of these problems. Exemplary of such efforts are the teachings of U.S. Pat. No. 3,976,295 and Canadian Patent No. 632,220. However, as in any sport, participants therein and distributors of such equipment are reluctant to change from existing equipment, and therefore, balls intended to replace the conventional baseball have had minimal acceptance. Although there has been some success in various sports fields with plastic equipment, exemplified by U.S. Pat. No. 3,268,636 and 3,313,545, the lack of success in the baseball and softball area is attributed to factors such as a difference between the playing properties of the conventional ball and the proposed replacement balls. One such property, which is particularly important, is the sound which is produced when the ball is hit by the bat.

Thus, in accordance with the present invention, baseballs and softballs are manufactured which have substantially the same physical properties as conventional balls, including sound when struck. Further, the balls have uniform properties and are produced economically.

BRIEF DESCRIPTION OF THE INVENTION

A flowable homogeneous mass of a thermoplastic resin and a blowing agent is injected into the spherical cavity of a mold under temperature and pressure conditions sufficient to activate the blowing agent. The mold is cooled to 32° to 65° F. so as to form a skin on the surface of the mass. The mass is held within the mold cavity for a sufficient time so that the skin has adequate strength to prevent its rupture by blowing agent contained within the mass upon removal of the mass from the mold cavity. The mass is cooled at an exterior temperature of 32° to 65° F.

In a preferred embodiment of the invention, the flowable homogeneous mass is formed from a blowing agent and an ethylene vinyl acetate copolymer having 12% to 30% by weight polymerized vinyl acetate units. This homogeneous mass is injected, under temperature and pressure conditions sufficient to activate the blowing agent, into the spherical cavity of a mold; the mold temperature is substantially below the melting point of the copolymer so as to form a non-porous skin on the surface of the mass. The mass is held in the mold cavity for a sufficient time to form the non-porous skin which has adequate strength to prevent rupture of the skin by blowing agent contained within the mass, upon removal of the mass from the mold cavity. The mass is cooled to form a game ball core having a dimension substantially the same as the mold cavity.

A ball formed in accordance with the invention is comprised of a spherical core and a cover. The core is a single spherical mass of partially blown thermoplastic material. The core is characterized by having foam in the core center gradually reducing in cell size radially outwardly to a skin having a density substantially equal to the density of the copolymer.

BRIEF DESCRIPTION OF THE DRAWING

The drawing shows in a flow diagram the steps of injection molding the foamed EVA copolymer ball core, removing the unstable core from the mold and cooling the core.

DETAILED DESCRIPTION OF THE INVENTION

The thermoplastic resins useful in the practice of the invention, in general, are polymers and copolymers of olefinically unsaturated compounds and their derivatives such as ethylene vinyl acetate copolymers, polyethylene, polypropylene, styrene, vinyl resins, nylons, polycarbonates, thermoplastic polyurethanes, polyhydroxy ethers, thermoplastic phenolics and the like. Most preferably, an ethylene vinyl acetate copolymer has been found to be the most useful, particularly ethylene vinyl acetate copolymers having polymerized acetate contents of 12% to 30% and most preferably 18% to 25%. When below 12% vinyl acetate units are within the poymer chain, the final ball core is too hard and does not exhibit sufficient elasticity and rebound to be acceptable in the baseball and softball industries. Above 30% polymerized vinyl acetate within the polymer chain, produces a ball core which is too soft, and again is not useful as a baseball or softball core. The melt flow rate (ASTM1238-73) of such ethylene vinyl acetate copolymers is preferably beween 0.5 and 4.5 and most preferably, 3 to 4. Blends of vinyl acetate copolymers having polymerized vinyl acetate unit contents outside of the preferred range and also within the preferred range, may be blended to obtain polymerized vinyl acetate unit contents within the preferred range.

The blowing agent used in the practice of the invention can be a heat decomposable compound, a gas, or a liquid which is volatile under molding conditions.

Exemplary of the heat decomposable blowing agents are; azo-N-nitroso carbonate, sulfonyl hydrazide, and azodicarbonamide. Upon decomposition, these compounds yield a gas such as carbon dioxide or nitrogen. The gases which may be employed as a blowing agent are typically methylchloride, propylene, butylene and gaseous florocarbons. Liquid blowing agents such as water and liquid florocarbon blowing agents known to those skilled in the art can also be employed to foam the polymer.

The heat decomposable blowing agents are preferred in the practice of the invention and are used in the range of 0.06% to 1% by weight and preferably 0.12% to 0.6% by weight. Typically the softballs have a lower bulk density than the baseballs and therefore must be formed using higher blowing agent levels. For baseballs 0.12% to 0.24% by weight based on the total weight of thermoplastic material is desired. For softballs 0.48% to 0.72% by weight based on the total weight of thermoplastic material is desired.

A parameter which must be considered when selecting a blowing agent, is its decomposition or activation temperature in relation with the rheological properties of the polymer. Thus, for example, diazoaminobenzene can be employed which activates and decomposes at 95° C. to 105° C. while azodicarbonamide can be employed at activation and decomposition at the higher temperature range of 160° to 200° C. Although the blowing agents operationally activated at relatively discreet temperatures, the broader activation range is provided by the addition of an activator which reduces the activation temperature. A typical activator is zinc oxide which may be employed at levels of 0.1% to 0.2% based on the weight of the blowing agent.

Activation when used in relation to the non-heat decomposable blowing agents means the temperature and pressure conditions at which the blowing agent forms a gas.

In actual practice, the blowing agent is homogeneously mixed with the particular thermoplastic resin in particulate form, by tumble blending at ambient temperature. The particulate mixture is mixed under temperature and pressure conditions suitable to homogenize the mixture and form a dispersion or solution of the blowing agent in the resin. The dispersion or solution is extruded and cut into pellets or ground into powder form. The extruded material is often called a masterbatch. The blowing agent is incorporated into the resin used in the final ball by tumble blending the particulate thermoplastic material with the masterbatch. Typically a masterbatch yielding 30 to 50 mls/gram and preferably 35 to 45 mls of gas at standard temperature and pressure is desired. Consequently the masterbatch is used at a range of 1% to 6% by weight based on the weight of the total resin and preferably 1% to 5 % and more preferably 1% to 2% for baseballs and 4% to 6% and more preferably 4.5% 5.5% for softballs.

The process of the invention is practiced in a conventional injection molding machine. The thermoplastic resin in particulate form is tumble blended with the masterbatch until homogeneous. The blend is charged to the hopper of an injection molding machine which melts the resin under heat and pressure converting it to a flowable thermoplastic mass. Preferably when an ethylene vinyl acetate copolymer is used the feed temperature is at about 200° to 220° C., and the extruder barrel temperature of 230° to 250° C. and a nozzle temperature of 240° to 260° C.

The nozzle of the injection molding machine is in liquid flow communication with a mold whose mold cavity or cavities is of substantially the same dimension as the final core. The molds are water cooled to a temperature of 32° to 65° F. and preferably 35° to 45° F. which is necessary to form a skin on the surface of the thermoplastic mass injected into the mold. Upon injection of the required amount of thermoplastic material into the mold cavity, the mold is continuously cooled with water to maintain the mold cavity surface at the low temperature. The thermoplastic mass is held in the mold for 4 to 6 minutes and more preferably, from 4½ to 5 minutes in order that the thermoplastic mass form a skin of adequate strength so that upon removal of the mass from the mold, the blowing agent contained within the mass does not rupture the skin. When the thermoplastic mass is removed from the mold before it has been within the mold for the prescribed time, the blowing agent ruptures the skin and molten resin exudes from the interior of the ball. The upper limit of residence time within the mold is a matter of economics since the thermoplastic mass may be held within the mold for an indefinite period of time. However, since production speed and re-use of the mold is desirable, economic residence duration is defined as the upper limit. Upon removal of the mass from the mold, the sprue is cut with a small excess above the surface of the sphere to allow for shrinkage, and the formed ball core is placed in a water immersion bath at 32° to 65° F., and more preferably, 35° to 45° F. Initially the ball core expands due to the internal pressure of the blowing agent, in the case of baseballs, to 8 13/16" to 9" in circumference and shrinks to its original size while in the water bath. The minimum period of quenching time in the water bath is about 15 minutes. If the ball is not sufficiently cooled in the water bath, it does not shrink and an oversize product is obtained. After removal from the water bath, the balls are placed on a rack at ambient temperature. The sprue is removed by sanding or a like process and a conventional ball cover is sewn thereon.

Ball cores formed from the above process have dimensions substantially the same as the mold cavity, and such cores can be produced within tolerances of plus or minus 0.1% deviation in circumference and plus or minus 0.6% deviation in weight. The ball is characterized by a smooth surface and a shore surface hardness of 70 to 90, and more preferably, 75 to 85, and has the characteristic bounce and sound of the conventional baseball or softball.

The interior of the ball has been examined by cross sections thereof and is characterized by foam in the center of the core with a gradual reduction in cell size extending radially outwardly to the skin which has a density substantially equal to the density of the copolymer. The skin constitutes about 3% to 15% of the spherical radius of the core and more preferably 8% to 12%.

The following examples are not intended to limit the invention, but are by way of illustration.

EXAMPLE I

Fifty parts of a particulate ethylene vinyl acetate copolymer resin having 24% by weight polymerized vinyl acetate units therein and a melt flow index of 3, sold as Evatane 2403 by ICI, was tumble blended with 50 parts of a particulate ethylene vinyl acetate copolymer resin having 12.5% by weight polymerized vinyl acetate units therein and a melt flow index of 4, sold as Evatane 6455 by ICI, along with 1.37 part of a blowing agent having an activation temperature of 170° C. and evolving 40mls of gas at standard temperature and pressure sold as masterbatch 0261 by ICI. The tumble blended mixture was charged to a screw and ram injection molding machine having a feed temperature of 220° C. a barrel temperature of 250° C. and a nozzle temperature of 260° C. The extrusion time was about 4 to 6 seconds with a total residence time of about 10 seconds. Nineteen ounces of the molten resinous mass was injected from the nozzle into the cavity of a mold which is chilled by circulatory water cooling at 44° F., the mold cavity has four separate spherical sectors, each about 8 13/16 inches and are connected by a channel leading to the exterior of the mold. The channel is in liquid flow communication with the nozzle of the injection molding machine during injection of the resinous mass.

Upon injection of the thermoplastic flowable mass into the mold cavity, the resultant gas expands and foams the thermoplastic flowable mass to fill the mold cavity. The thermoplastic mass was held in the mold for about 5 minutes and removed. Upon removal the molded resin was in the form of four ball cores connected by the sprue formed within the channel. The sprue was cut allowing a slight excess to remain above the sphere. The individual cores were placed in a water bath maintained at 42° to 46° F. for 15 minutes. During cooling the cores expanded to about nine inches and shrunk to 8 13/16 inches. The cores were removed from the water bath and stored at ambient temperatures for 24 hours. The cores have a surface "shore" hardness of 80, and a skin thickness of about ⅛ inch. The sprue was ground off with a grinding wheel and two piece leather covers were sewn on the cores. The baseballs so formed had a circumference of 8.92 inches and a weight of 5.35 ounces with the core having a circumference of 8 13/16" and a weight of 4 5/8 ounces. Upon testing the balls had a 32.4% rebound and exhibited comparable playing characteristics to conventional balls.

EXAMPLE II

Example I is repeated to form softball cores except that 4.5 parts of blowing agent is used and the mold circumference is 11 9/16 inches. The softballs produced in accordance with the invention exhibit excellent playing characteristics.

Although the invention has been described with reference to specific materials under specific conditions, the invention is only to be limited in so far as is set forth in the accompanying claims.

I claim:

1. A method of forming a game ball core comprising:
    forming a flowable homogeneous mass from a thermoplastic resin and a blowing agent by the application of heat and pressure thereto in an injection molding machine;
    injecting said mass into the spherical cavity of a mold cooled to 32° to 65° F. to foam said mass and fill the mold cavity;
    holding said mass in the mold cavity for a sufficient time to form a non-porous skin on the outer surface of said mass, said skin being of adequate strength to prevent rupture of the skin by blowing agent contained within the mass upon removal of said mass from the mold cavity, said time being less than required to dimensionally stabilize said mass; removing said mass from the mold; and cooling said mass at an exterior temperature of 32° to 65° F. to produce a game ball core having a dimension substantially the same as the mold cavity.

2. The method of claim 1 wherein said thermoplastic resin is an ethylene vinyl acetate copolymer having 12% to 30% by weight polymerized vinyl acetate units.

3. The method of claim 2 wherein said ethylene vinyl acetate copolymer has 18% to 25% by weight polymerized vinyl acetate units.

4. The method of claim 1 wherein said mold is cooled to a temperature of 35° to 45° F.

5. The method of claim 1 wherein said mass is held in said mold for greater than four minutes.

6. The method of claim 1 wherein said cooling is provided by immersing said mass in a cooling bath having a temperature of 32° to 65° F.

7. The method of claim 6 wherein said cooling bath has a temperature of 35° to 45° F.

8. The method of claim 6 wherein said mass is immersed for at least 15 minutes.

9. The method of claim 1 wherein said mass is cooled at an exterior temperature of 35° to 45° F.

* * * * *